(No Model.) 9 Sheets—Sheet 1.

S. V. KENNEDY & C. A. ANDERSON.
SELF BINDING HARVESTER.

No. 382,532. Patented May 8, 1888.

(No Model.) 9 Sheets—Sheet 6.

S. V. KENNEDY & C. A. ANDERSON.
SELF BINDING HARVESTER.

No. 382,532. Patented May 8, 1888.

(No Model.) 9 Sheets—Sheet 7.

S. V. KENNEDY & C. A. ANDERSON.
SELF BINDING HARVESTER.

No. 382,532. Patented May 8, 1888.

(No Model.) 9 Sheets—Sheet 8.

S. V. KENNEDY & C. A. ANDERSON.
SELF BINDING HARVESTER.

No. 382,532. Patented May 8, 1888.

(No Model.) 9 Sheets—Sheet 9.

S. V. KENNEDY & C. A. ANDERSON.
SELF BINDING HARVESTER.

No. 382,532. Patented May 8, 1888.

Fig.26.

Witnesses:
a. M. Jones.
M. L. Adams.

Inventors:
Samuel V. Kennedy,
Charles A. Anderson.
Per Edw. E. Quimby.
Atty.

UNITED STATES PATENT OFFICE.

SAMUEL V. KENNEDY AND CHARLES A. ANDERSON, OF MINNEAPOLIS, MINNESOTA, ASSIGNORS TO THE MINNEAPOLIS HARVESTER WORKS, OF SAME PLACE.

SELF-BINDING HARVESTER.

SPECIFICATION forming part of Letters Patent No. 382,532, dated May 8, 1888.

Application filed June 25, 1887. Serial No. 242,433. (No model.)

*To all whom it may concern:*

Be it known that we, SAMUEL V. KENNEDY and CHARLES A. ANDERSON, of Minneapolis, Minnesota, have invented certain Improvements in Self-Binding Harvesters, of which the following is a specification.

The objects of this invention are to simplify the construction, and hence to diminish the cost, of self-binding harvesters, while also increasing their efficiency in operation.

The invention embraces, first, a truss in which are incorporated the wheel-beam and segment-rack for carrying the main frame of the harvester upon the axle of the main wheel, so constructed that the members of the said truss have the capacity of alignment and relative adjustability, whereby there is afforded a convenient and effective means for accurately adjusting and preserving the driving and the driven gear in their appropriate relative positions; second, reel-supporting mechanism which is readily attachable to or detachable from the machine, and is of such construction that the greater part of the weight of the reel, &c., instead of being carried upon the seat-plank, is carried upon the frame-work of the harvester below the seat-plank, whereby the reel-post is increased in length, and in addition to having its lower end pivotally supported upon the frame-work of the harvester, is so held by a guide near its upper end as to prevent it from being tilted toward the grain side of the machine by the weight of the reel; third, a grain-adjuster having its swinging frame so mounted as to be readily removable from the bracket which supports it, for the purpose of putting on or taking off the adjuster-belt, thus permitting the use of a belt having its ends permanently united, and dispensing with the straps or buckles heretofore used for connecting together the ends of the adjuster-belt; fourth, binder-supporting standards which are self-locking in their seats or sockets, and while they are conveniently detachable from or attachable in their proper positions are by their self-locking capacity effectually secured therein without the use of bolts, cotters, or other movable devices; fifth, a windlass for raising and lowering the machine, so arranged that the strain of the windlass-chain is sustained directly by the main frame-work of the harvester, and the lever for operating the said windlass, so arranged as to be within convenient reach from the driver's seat and to be entirely out of the way of the elevator; sixth, a stiffening-plank for connecting portions of the front and rear platform-sills which are between the beam at the grain side of the grain-wheel and the grain end of the platform.

The accompanying drawings of a self-binding harvester containing the improvements are as follows.

Figures 5, 7, 8:
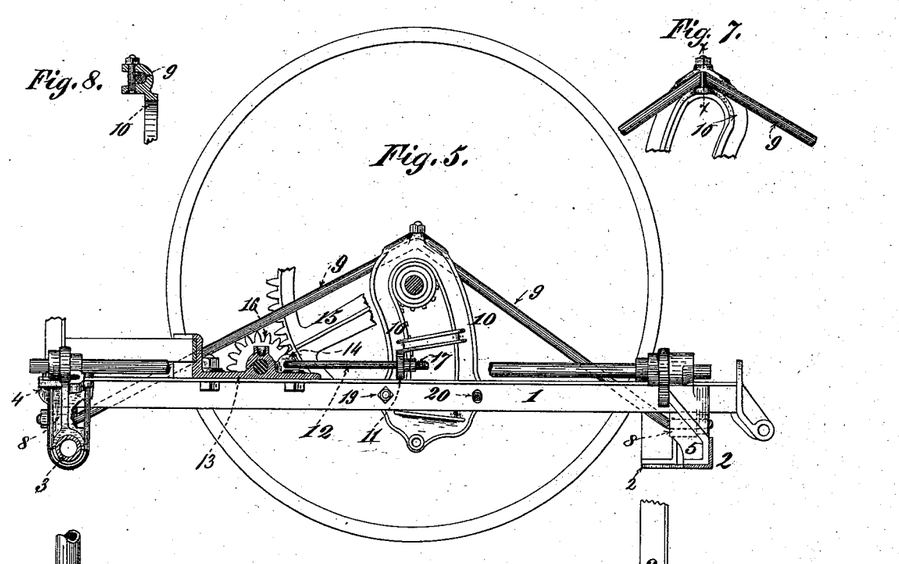
Fig. 5 is an elevation, partly in section, showing the trussed wheel-beam construction.
Fig. 7 is an elevation of the upper part of the side of the segment-rack which is toward the drive-wheel.
Fig. 8 is a section taken through the line $xx$ on Fig. 7.
Figure 6:
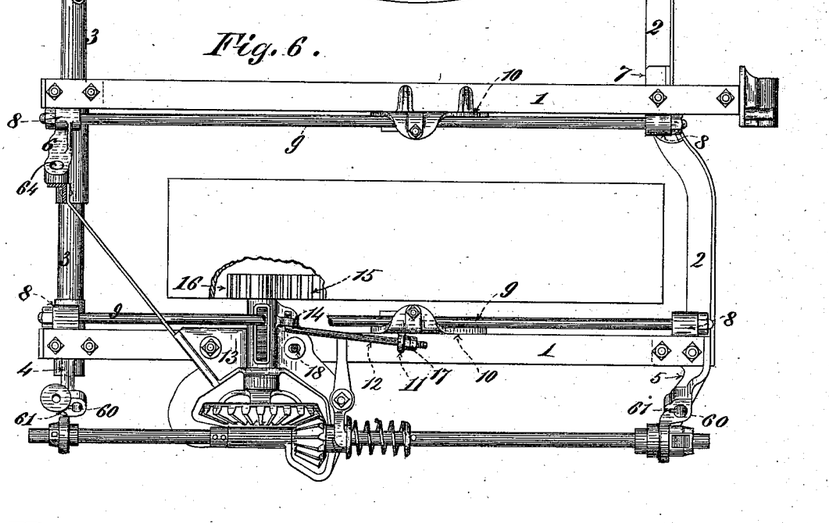
Fig. 6 is a top view of the main frame.

In Figs. 5 and 6, 1 are the wheel-beams, of common straight angle-iron. 2 is an extension of the cutter-bar, forming the forward part of the main-wheel frame, and 3 an extension of the tubular rear sill of the platform, forming the rear part of the main frame.

4, 5, 6, and 7 are bolsters connecting the front and rear ends of the wheel-beams, respectively, with the front and rear parts, 2 and 3, of the main frame. The bolsters 4 5 6 7 are provided with holes 8, which serve as the seats, respectively, for the ends of the truss-rods 9.

10 are segment racks or standards adjustably bolted to the wheel-beams, respectively, and used to carry the machine on the main wheel at varying heights in the usual manner. Each segment-rack has the additional function of serving as a strut for one of the truss-rods 9, which passes through a clip at the upper end of the segment-rack, within which it is rigidly secured by a pinch-bolt, as shown in Figs. 7 and 8.

11 is a lug on the lower part of the segment-rack 10, for the reception of the forward end of an adjusting-rod, 12.

13 is the main gear frame, within which a pair of bevel-gears are mounted, and which is adjustably secured to the wheel-beam 1, and has a lug at 14, in which the rearward end of the adjusting rod 12 is secured.

It will be understood that as the segment-rack 10, and therewith the main frame of the machine, is supported at different heights upon the axle of the main wheel, upon which axle the main spur-wheel 15 is mounted, the said segment-rack must be in the form of an arc described from the center of the main pinion 16, and should be at all times concentric therewith to insure the proper relation between the driving and the driven gears when the axle of the main wheel is in different positions within the segment-rack 10. The proper distance between the centers of the driving and driven gears 15 and 16, when the axle of the main wheel is at the lower part of the segment-rack 10, is secured by means of the adjusting-nut 17 on the adjusting-rod 12, the gear-frame 13, which carries the pinion 16, being adjustably secured to the wheel-beam 1 for that purpose, as shown at 18, Fig. 6. The proper distance between the centers of the driving and driven gear, when the axle of the main wheel is at the highest part of the segment-rack, is secured by adjusting the truss rod 9 endwise in its seats 8 by means of the nuts shown at the ends of the said truss-rod, by which the top of the segment-rack is rocked forward or backward, as may be desired. Provision for such adjustment is made by pivoting the rack upon the bolt 19 and elongating the bolt-hole 20 sufficiently to permit the necessary movements, as shown in Fig. 5.

By the use of common straight-angle iron for the wheel-beam 1, of a common iron rod for the suspender or truss-rod 9, and of the segment-rack for the strut, a trussed wheel-beam or truss is produced with a comparatively small outlay for labor and material, which, by the mere turning of the adjusting nuts at the ends of the truss-rod, can always be brought into perfect alignment, and can be kept from yielding to the tendency to sag under the great weight it has to sustain, and which, in addition to possessing the adjustable features described, is of great strength and unusual simplicity.

In Figs. 4, 9, 10, and 11, 21 is a reel-supporting arm hinged to a reel-post, 34 at 22, and carrying the reel-shaft at 23.

Figure 9:
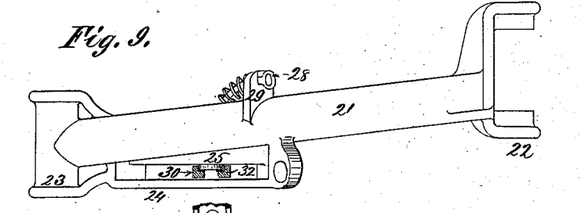
Figs. 9 and 10 are respectively a top view and a side elevation, showing the reel-supporting arm and the latch for holding the same in vertical adjustment.
Figures 10, 11:
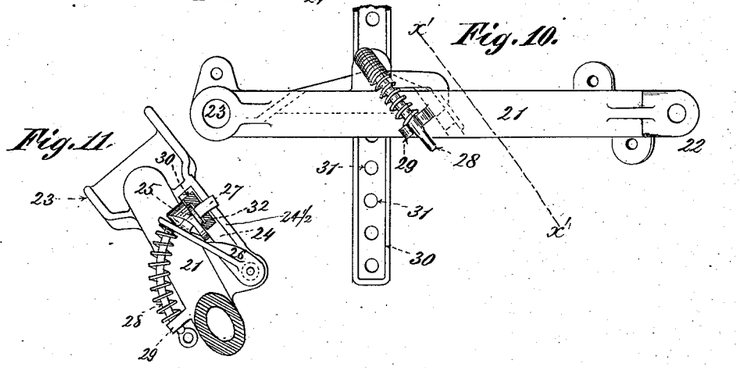
Fig. 11 is a section of the reel-supporting arm, taken through the plane indicated by the dotted line $x'x'$ on Fig. 10.

24 is a slot formed in a rib, 24½, cast on the side of the reel-supporting arm 21, and provided upon one of its walls with the perforated boss or projection 25.

Figure 4:
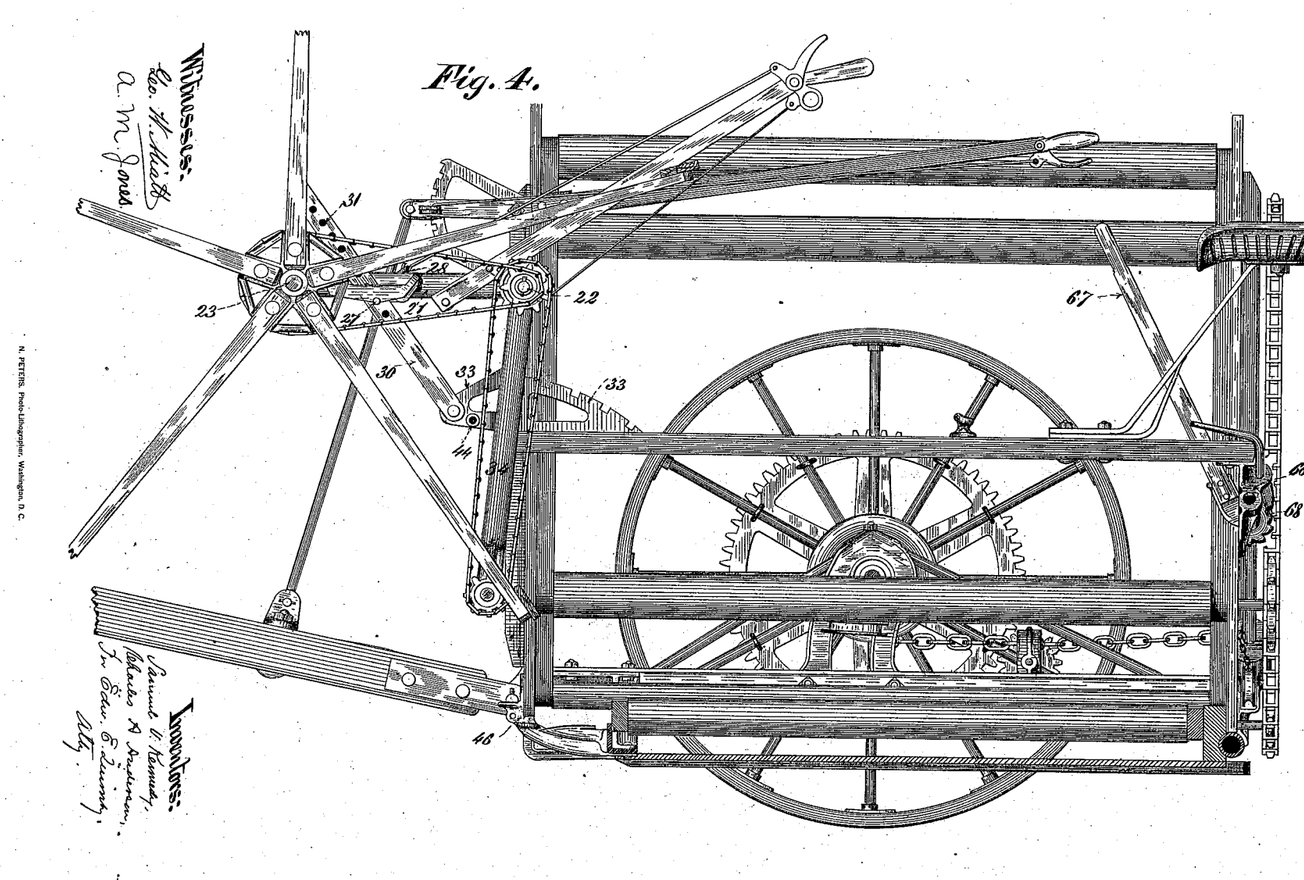
Fig. 4 is an elevation of the grain side of the machine.

26 is a swinging latch-arm pivoted in rear of the slot 24, carrying upon one side a curved bolt or latch, 27, which works through the perforated boss 25, and carrying upon its other side an arm, 28, which is curved concentrically with the pivot of the latch-arm, and passes through a slot in the lug 29, cast on the reel-supporting arm 21, and which has its end connected by a connecting-rod to a suitable handle, as shown in Fig. 4. An expanding spiral spring upon the arm 28, abutting at one end against the lug 29 and at its opposite end against the latch-arm 26, as shown, returns the bolt 27 to its locking position, and retains it therein after it has been withdrawn therefrom to permit the adjustment of the reel.

30 is a brace provided with holes 31 for engaging the latch or bolt 27, and with side flanges, 32, which embrace and slide over the boss 25, as shown in Figs. 9 and 11. The brace 30 is pivoted at its lower end to the quadrant-rack 33, as shown in Fig. 4, and, as will be seen, when the bolt 27 is disengaged from the brace 30, the reel-supporting arm 21 (and with it, of course, the reel) may be moved up or down at will, the brace 30 being retained in place in the meantime by the boss 25, seated in the groove 32. It is also obvious that this construction permits the brace 30 to rock to the extent required upon the bolt 27 and boss 25 when the reel is being adjusted.

Figure 1:
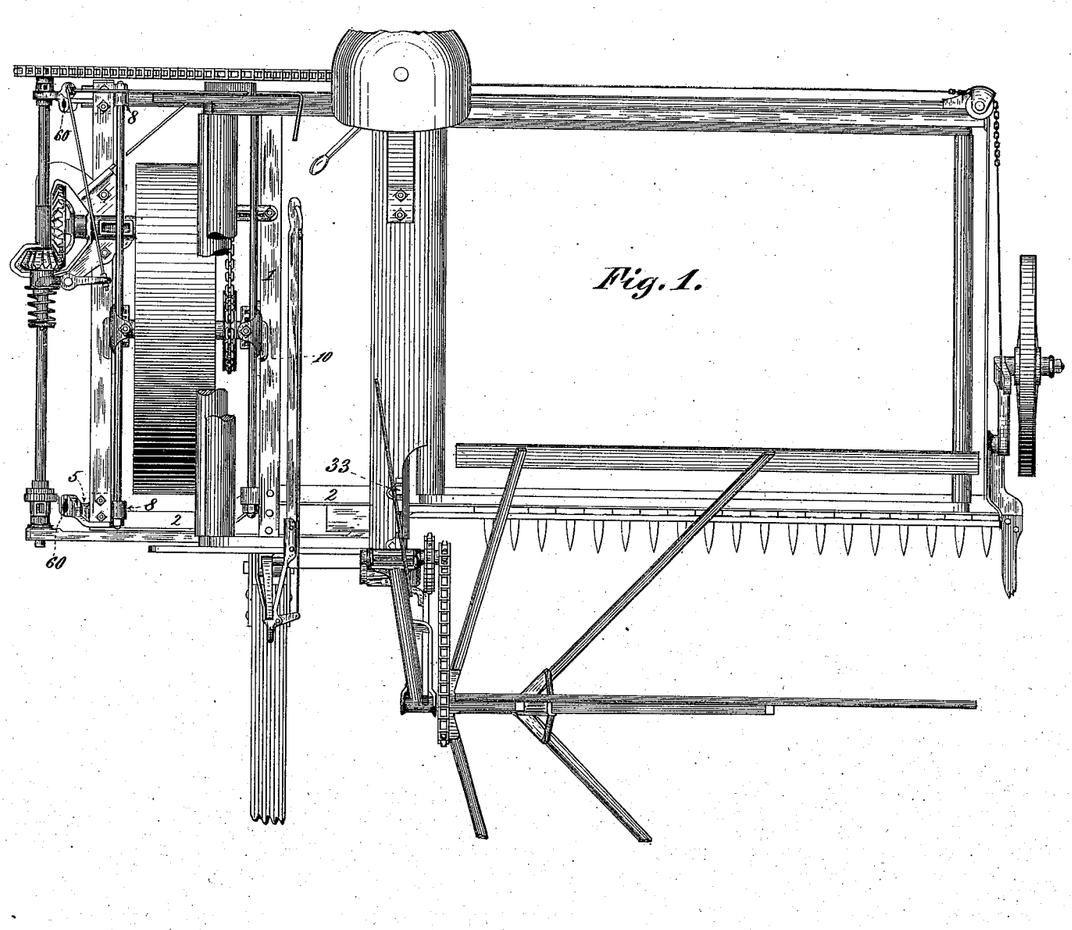
Figure 1 is a top view of the harvester.
Figures 2, 22, 23:
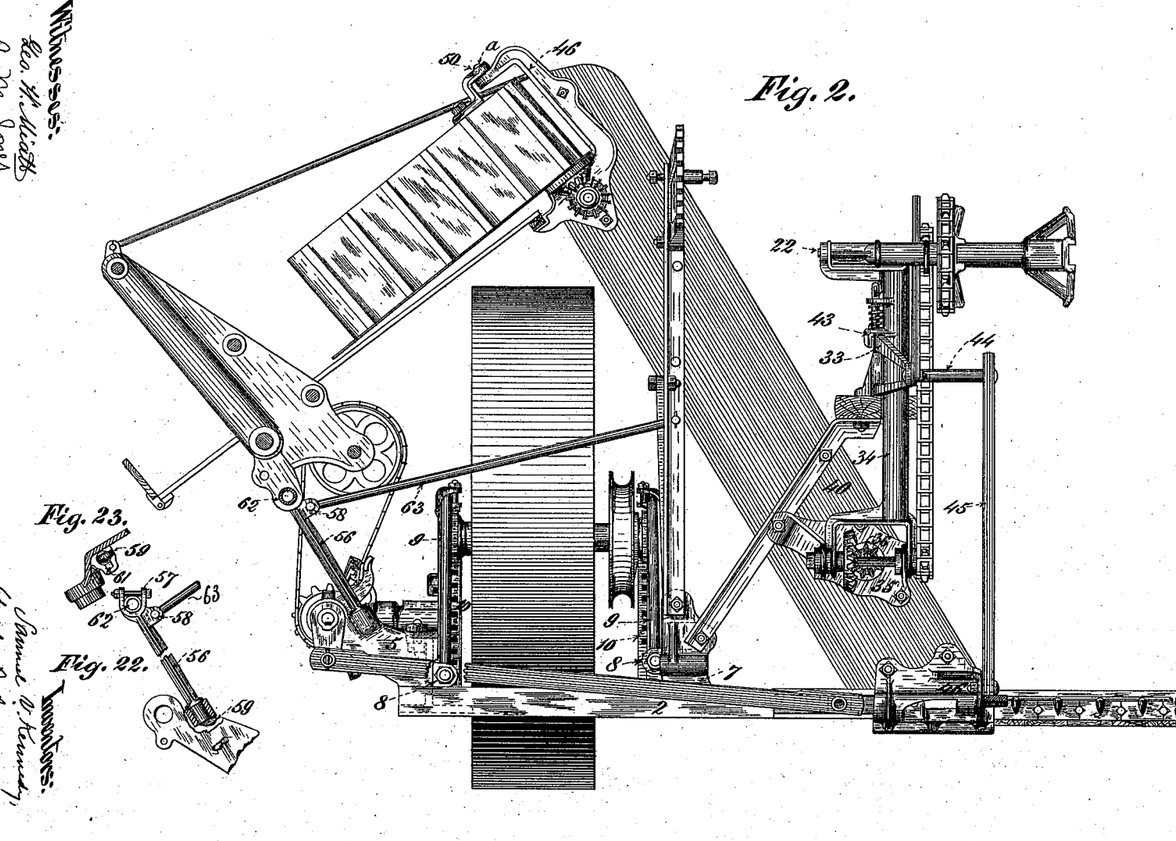
Fig. 2 is a front elevation.
Figs. 22 and 23 are details showing the construction of the binder-supporting standard.
Figures 12, 13, 14, 15, 16:
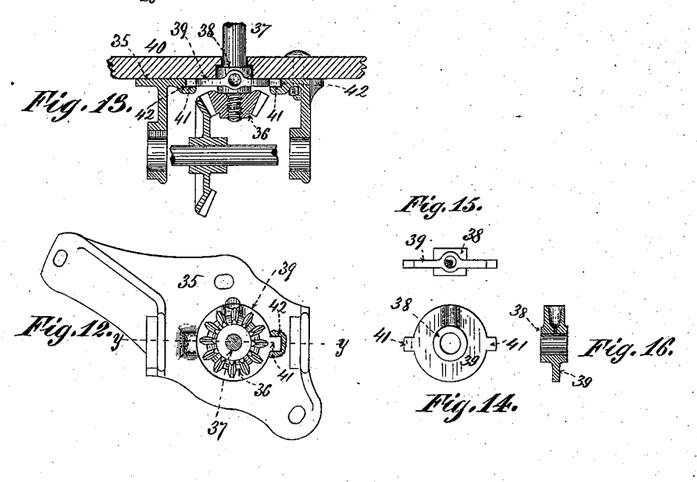
Fig. 12 is an elevation of the cast-iron gear-frame, which serves as the support for the reel-post, and which is bolted to the frame of the harvester.
Fig. 13 is a horizontal section of this gear-frame, taken through the line $yy$ on Fig. 12.
Figs. 14, 15, and 16 are respectively a front elevation, a top view, and a vertical section of the journal for the beveled spur-wheel (shown in Figs. 12 and 13) for driving the reel-gear.

The reel-post 34 at its lower end is hinged to the gear-frame 35, Figs. 2, 12, and 13, attached to the frame-work of the harvester, as shown.

The reel is rotated by a train of gearing driven by a pinion, 36, affixed to the shaft of the lower roller of the upper elevating-canvas, as shown.

As shown in Fig. 13, the forward end of the shaft 37 has its bearings in the hub 38 of the disk 39, which is seated on the annular shoulder formed by counterboring the front end of the hole in the elevator-frame board 40, through which hole the shaft 37 projects. The disk 39 is provided with radial projections 41, and the inner face of the web of the gear-frame 35 with recesses 42, in which the projections 41 are seated when the gear-frame is bolted in place upon the elevator-board, as shown. The web of the gear-frame is provided with an opening of sufficient diameter to pass over the driving-pinion 36. This construction greatly facilitates the appropriate assembling of the described members of the reel-supporting mechanism, supposing the same to have been taken apart for shipment or otherwise.

The operation of assembling is as follows: The shaft 37 is inserted through the counterbored hole in the elevator-board. Then the hub 38 of the disk 39 is passed over the end of the shaft 37 and against a shoulder formed by turning down the forward portion of the shaft 37 to receive the pinion 36, which is then screwed on, as shown. The gear-frame 35, carrying its bevel-gear and counter-shaft, is passed over the pinion 36 and bolted to the board 40, with the projections 41 of the disk 39 seated in the recesses 42. By this means the forward bearing for the shaft 37 is firmly held in place without further fastening, as is clearly shown in Figs. 12 and 13. The reel-post, Fig. 2, is provided with a laterally-projecting fixed hook, 43, for hooking over the upper edge of the quadrant-rack 33, which rack is firmly bolted to the seat-plank. The hook 43 serves to hold the reel-post against the said quadrant-rack, over which the hook 43 slides whenever the reel-post is swung forward or backward for the adjustment of the reel. A hole in the horizontal part of the hook 43 serves as a guide for one end of a latch-bolt, which, by engaging one of the notches in the quadrant-rack 33, holds the reel-post in position after adjustment. A forwardly-projecting extension of the quadrant-rack 33 has cast upon it or otherwise affixed to it a horizontal lug or bar, 44, to which the upper part of the divider 45 is rigidly secured, the lower part being bolted to the main shoe 46, which is in turn secured to the main frame-work of the machine.

Several important advantages accrue from this construction. Thus by mounting the reel upon the gear-frame 35 so far below the seat-plank opportunity is afforded for the use of an unusually long reel-post, thus lengthening the radius upon which the reel moves when it is undergoing forward or backward adjustment. The weight of the reel is removed from the seat-plank to a lower and stiffer connection with the frame-work of the harvester, thereby doing away with the tendency of the reel to twist the seat-plank when its whole weight is carried thereon. At the same time the strength of the seat-plank is effectively utilized, through the quadrant-rack 33 and hook 43, to hold the reel-post in its proper vertical plane and prevent it from being tilted toward the grain side of the platform by the weight of the reel. Finally, by using the divider-board 45 as an auxiliary brace or support between the quadrant-rack 33 and the main shoe 46, in combination with the devices described, the reel-supporting mechanism is made so rigid and unyielding that the weight, and hence the cost, of the principal supporting parts can be greatly reduced without unsuitably diminishing the strength or efficiency thereof.

A method analogous to that employed for supporting the reel-post is employed for supporting the grain-adjuster. These devices include a supporting-bracket, $46^\times$, which is shown in elevation in Fig. 2 and illustrated in detail in Figs. 17, 18, 19, and 20.

The adjuster-frame 47, which carries the rollers 48 and 49 at its opposite ends, respectively, is pivotally mounted within the bracket $46^\times$ in the following-described manner: A suitably-offset clip, 50, bolted to the upper side member of the adjuster-frame, is provided, preferably upon its under side near its free end, with a nipple, $a$, for engaging a hole formed in the arm $b$ of the bracket in axial alignment with the shaft of the roller 48, which has its upper bearing in the upper side member, $c$, of the adjuster-frame. The shaft of the roller 48 extends downward through the lower side member, $c'$, of the adjuster-frame, the bottom shield, $c^2$, and through the hub of a disk, 51, which is fastened by screws to the adjuster-frame. The bottom shield, $c^2$, of the adjuster bears upon the upper surface of the laterally-projecting seat $d$, cast on the side of the bracket $46^\times$, and provided with a circular opening, 52, to serve as a bearing for the periphery of the disk 51, within which bearing the disk 51 turns when the adjuster is swung upon its axis. The disk 51 is provided with a radially-projecting lip, 53, and the seat $d$ is provided with a notch or opening, 54, through which the lip 53 is dropped preparatory to placing the disk in its bearing 52. The normal position of the adjuster when in use is such that the radial lip 53 bears upon the under side of the seat $d$. The lower end of the shaft of the roller 48 projects downward from the disk 51, and has affixed to it a bevel-pinion, 55, which is sufficiently small in diameter to pass through the opening 52 in the seat $d$, and is engaged and driven by a bevel spur-wheel affixed to the projecting forward end of the upper roller of the lower elevator-belt.

Figures 17, 21:
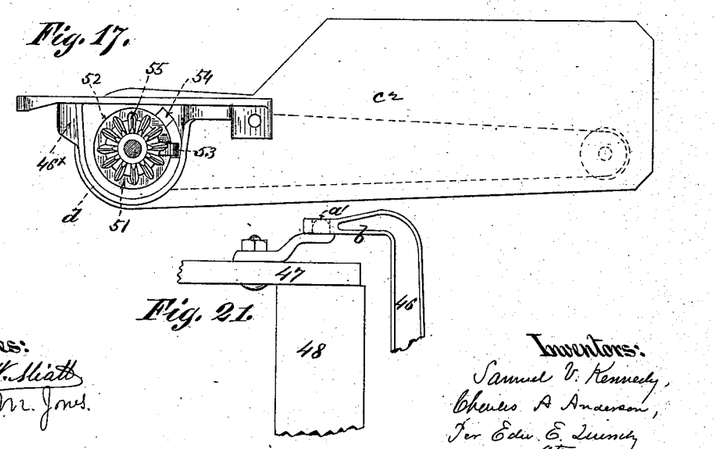
Fig. 17 is a view of the under side of the grain-adjuster and its supporting-bracket.
Fig. 21 illustrates an alternative method of connecting the swinging end of the grain-adjuster to the upper end of the supporting-bracket.
Figures 18, 19, 20:
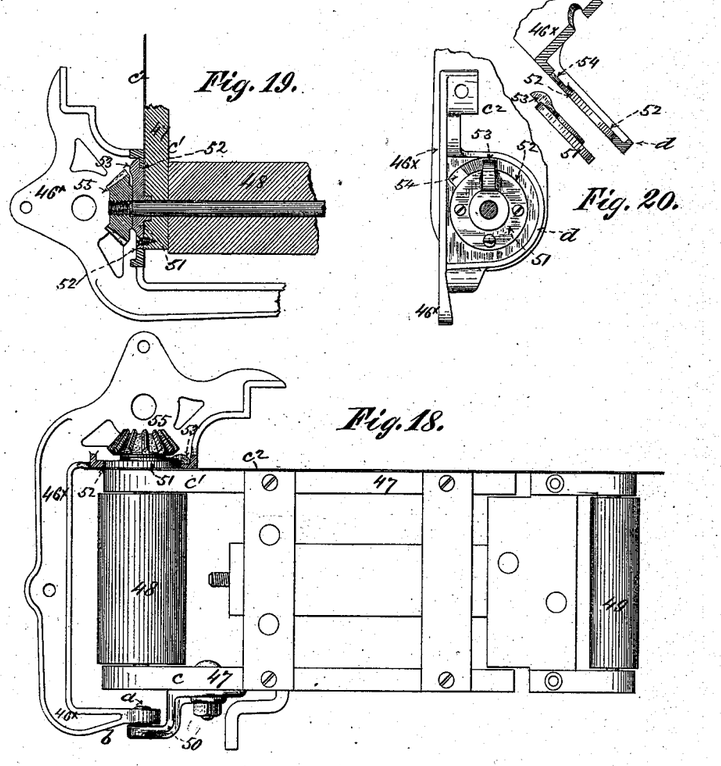
Fig. 18 is a side elevation of the grain-adjuster bracket and the grain-adjuster frame and rollers.
Fig. 19 is an elevation, partly in section, showing the lower part of the bracket which supports the grain-adjuster and the detachable journal for the roller-shaft, to which is attached the pinion by means of which the grain-adjuster belt is actuated.
Fig. 20 is a group of views showing further details in the construction of the adjuster bracket and journal.

The removal of the adjuster-frame from the bracket is effected, when the construction is that shown in Figs. 2 and 18, by swinging the adjuster-frame into such a position as will bring the radial lip 53 into line with the opening 54, after which the adjuster-frame, with the disk 51 and pinion 55, may be raised up and withdrawn from the bracket $46^\times$, sufficient clearance being provided between the arm $b$ of the bracket and the upper side member, $c$, of the adjuster-frame to permit the disk 51 to be raised out of its seat 52, so that the frame may be rocked sidewise and removed from the bracket. By a reverse operation the adjuster-frame is returned to its place in the bracket. By this construction the adjuster-frame is self-locking in the bracket in which it is mounted, and is removable therefrom without requiring the removal of any bolts, cotters, or other fastening devices. This part of the invention, however, is not intended to be limited to the precise construction described, as it is evident that it may be modified without materially affecting the desired result. Thus the offset-clip 50, instead of being provided upon its under side with the nipple $a$ for engaging a bracket-arm, $b$, as shown in Figs. 2 and 18, may be provided upon its upper side with a nipple, $a'$, as shown in Fig. 21, in which case it will of course be necessary to unfasten the clip 50 from the side member, $c$, of the adjuster-frame when it is desired to remove the adjuster from the bracket.

In Figs. 2 and 22, 56 is a binder supporting standard having the fork 57 at its upper end, as shown, the lug 58 on its side toward the grain side of the machine, and the hook or lip 59 at its lower end. In Fig. 22 a portion of the bolster 5 is broken away for the purpose of exhibiting the standard 56 and the hook 59 in elevation. The supporting-casting for this standard is an extension formed integral with the bolster 5, which serves to connect the outer wheel-beam with the front sill of the machine. The bolster 4, connecting the outer wheel-beam with the rear sill, is provided with a similar extension, and, as shown in Fig. 6, each of these extensions is provided with a hole, 60, having a groove, 61, like a key-seat, formed in it. The holes 60 are the sockets for the lower ends of the binder-supporting standards, and their grooves 61 are provided to allow space for the passage of the lip 59 when the standards 56 are placed in their sockets. The standard having been inserted in its socket is so turned as to bring the lug 58 into the position shown in Fig. 2, which swings the lip 59 into the position in which it is represented in Figs. 22 and 23, in which, as will be seen, it bears upon the under side of the socket in which the standard is inserted, and thus securely holds the standard in its proper position. When the lip 59 of each standard is caught under the socket, as shown in Fig. 22, the forks 57 are respectively in the proper positions to receive and support the front and rear ends of the binder-supporting pipe 62. The pipe 62 is secured in its place in the forks 57 by bolts passing through the said forks outside of the pipe, one of which is shown in Fig. 22.

The standards are respectively supported from the frame-work of the harvester by rods 63, connecting the lugs 58 to the upright angle-irons, which form a part of the elevator frame-work, as shown.

It is to be understood that the binder is mounted adjustably upon the pipe 62, as is commonly practiced. This mode of supporting the binder is both effective and inexpensive. The supporting mechanism is not only very light and neat in appearance, but has the required strength and rigidity, and its principal parts are put together as they are received from the foundry, without requiring any manipulation in the machine-shop, because they are cast in the proper form for immediate use. As will be seen, the binder-standards are self-locking in their sockets.

Figure 3:
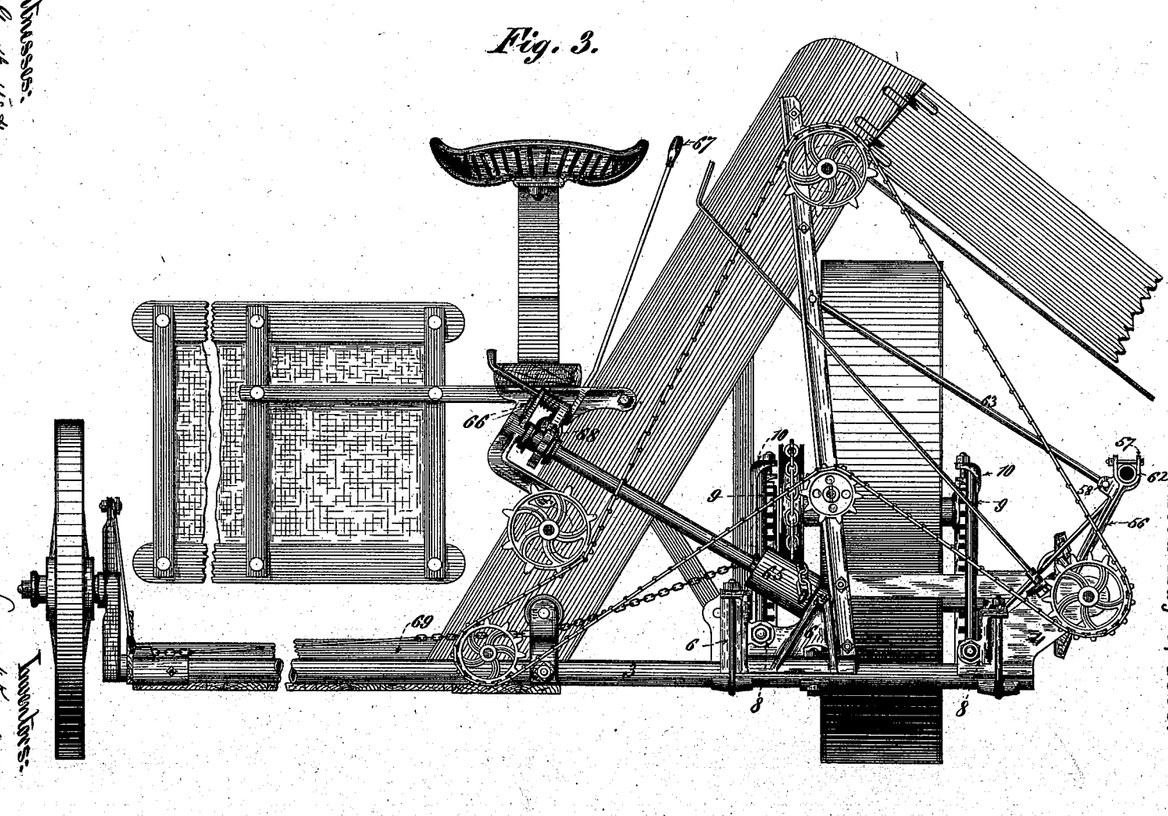
Fig. 3 is a rear elevation.

The bolster 6, Figs. 3 and 6, which serves to connect the inner wheel-beam to the rear sill, 3, of the main frame, has a bearing, 64, for supporting the lower end of the raising and lowering windlass 65, as shown in Fig. 3. The raising and lowering windlass extends upward in an oblique direction toward the grain side of the machine from the bearing 64 at substantially a right angle to the plane of inclination of the elevator, and its shaft is supported at its higher end in a suitable bearing formed in the bracket 66, which supports the seat-plank, at which end it is also provided with the usual operating-lever, 67, and retaining pawl and ratchet 68. It results from this organization that the operating-lever 67 will not be obstructed in its movements by the elevator, because when being operated for raising or lowering the machine it will move in a plane substantially parallel with the plane of inclination of the elevator, and thus at all points in its movement will be at substantially the same distance from the elevator, whereas when the windlass is in the horizontal position, in which it has usually been heretofore arranged, the plane of movement of the operating-lever is inclined to the plane of inclination of the elevator, and the range of possible movement of the operating-lever is hence necessarily circumscribed to prevent it from being moved into contact with the elevator-canvas. As the end of the windlass 65, whereon the raising-chains are wound, has its bearing in the bolster 6 of the main frame-work of the machine, the strain on the windlass-chains does not tend to "rack" the elevator-frame, and there is hence no objection to arranging the higher end of the windlass-shaft in the advantageously-elevated position near the driver's seat, in which it is shown in the drawings.

Figure 24:
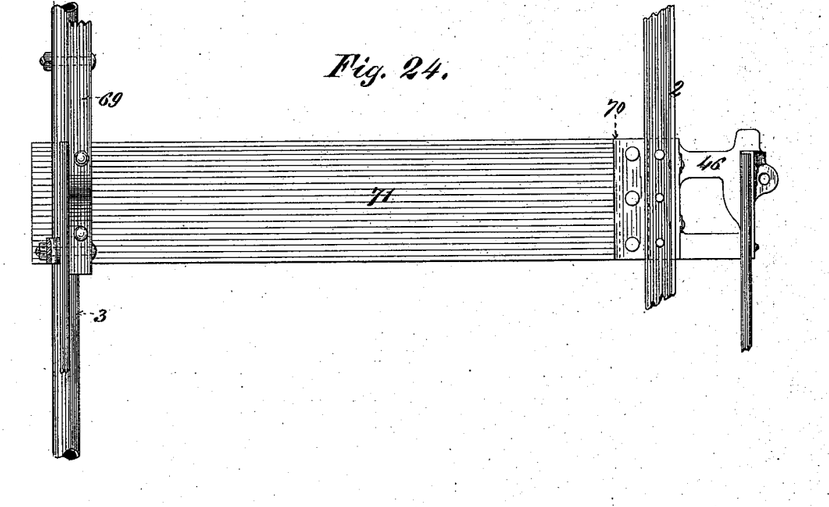
Fig. 24 is a top view of the stiffening-plank connecting the front and rear sills of the platform.
Figure 25:
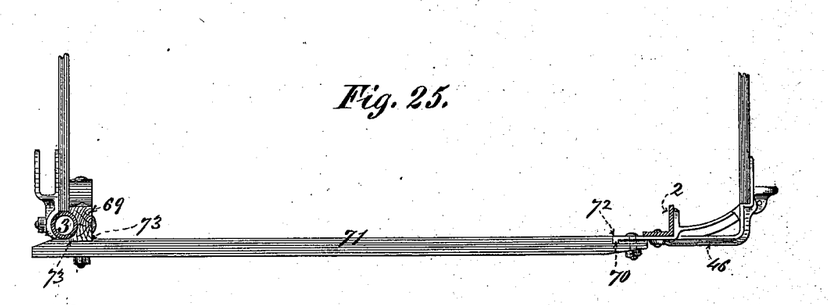
Fig. 25 is a side elevation of the stiffening-plank, showing the front and rear sills in transverse section.
Figure 26:
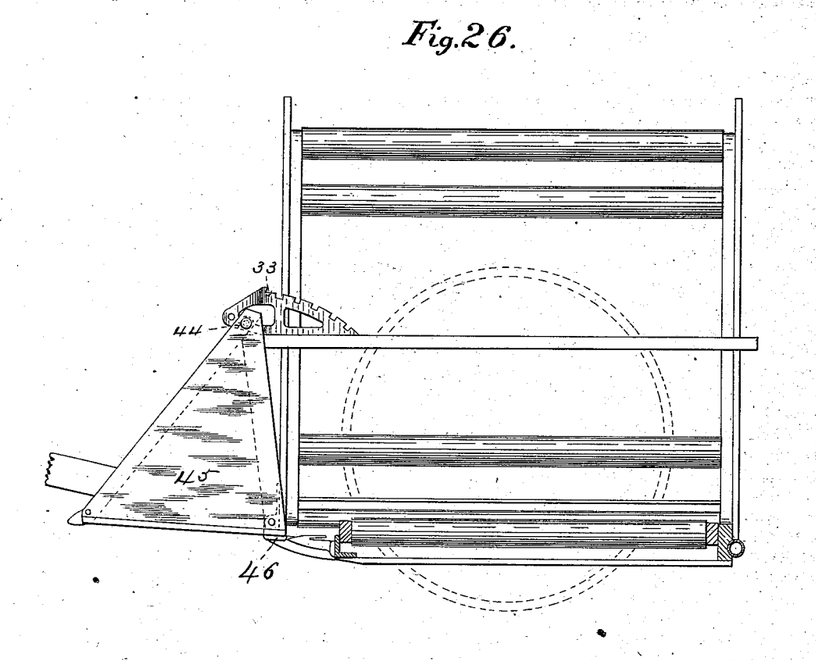
Fig. 26 is a transverse vertical section of the platform, affording a view in elevation of the grain side of the divider.

In Figs. 24 and 25, 2 is the front sill of the harvester-platform. 3 is the rear sill, which is preferably formed of pipe. 69 is a supplementary sill, of wood, bolted to the pipe 3, as shown. 46 is the main shoe, bolted to the front sill and having a rearwardly-projecting flange, with the lip 70 turned down thereon, as shown. 71 is a plank of suitable width, having the grooves 72 and 73 cut across its upper side to fit, respectively, the lip 70 of the shoe 46 and the supplementary sill 69. The plank is fastened by bolts to the shoe 46 and the supplementary sill 69. The snug seating of the lip 70 and the sill 69 in their respective grooves in the plank 71 firmly holds the platform against any tendency to be "racked" out of shape, a result which the bolts alone would be inadequate to effect, because they are liable to work loose in the holes in the plank through which they are inserted.

The grooves in the plank 71 are cut by machinery at an invariable distance from each other, and hence form a reliable guide in determining the proper distance between the parts of the front and rear sills, to which the ends of the planks 71 are respectively fastened.

What is claimed as the invention is—

1. In a trussed wheel-beam for grain-harvesters, the combination of the following elements: a main supporting-beam, an adjustable straining or truss rod above the same, an adjustable segment-rack for carrying the main frame upon the main wheel and forming a strut for the truss-rod, bolsters at the front and rear ends of the said main beam to connect the same with the front and rear sills, seats in each of the said bolsters for the truss-rods, and adjusting-nuts applied to the ends of the truss-rods which project through the said bolsters respectively.

2. In a trussed wheel-beam for grain-harvesters, the combination of a main supporting-beam, a straining or truss rod above the same, a segment-rack adjustably mounted upon the said main beam and rigidly secured at its upper end to the truss rod, and means for adjusting the truss rod endwise relatively to the ends of the said main beam, for the purpose of securing the upper end of the segment-rack in its proper position.

3. In a trussed wheel-beam wherein a segment-rack which supports the main frame upon the main wheel is used as a strut and is adjustable at its upper end by means of an endwise-adjustable truss-rod, an adjusting-rod for connecting the lower part of the said segment-rack to the main gear-frame, whereby the latter is held in proper relation to the segment-rack, and hence in proper relation to the main spur-wheel mounted upon the axle of the main wheel.

4. A pivotally-adjustable segment-rack for grain-harvesters and an adjusting-rod for the same, the upper part of the rack being provided with a bearing and a clamp for engaging the adjusting-rod, by which the upper end of the segment-rack, when it has been properly adjusted, is rigidly held in position.

5. In a reel-supporting device for harvesters, the gear-frame 35, adapted to be passed over the pinion 36 and bolted to the elevator-frame, the disk 39, adapted to be held in place by the gear-frame 35, and the pinion 36 for driving the reel-gear affixed to the shaft 37, inserted through the hollow hub 38 of the disk 39.

6. In a reel-supporting device for harvesters, the gear-frame 35, provided with the recesses 42, and adapted to be passed over the pinion 36 and bolted to the elevator-frame, in combination with the disk 39, having the projections 41, adapted to fit within the recesses 42, and to thereby hold the disk in place.

7. In a reel for harvesters, the combination, with the gear-frame 35, of the reel-post 34, the quadrant-rack 33, and the divider 45, having its upper part rigidly connected with the horizontal lug or bar 44, cast upon or otherwise affixed to the said quadrant-rack.

8. In a reel for harvesters, an adjusting and locking device consisting of the reel-supporting arm 21, the rib 24½, cast on the side thereof, provided with the slot 24, the perforated boss 25, the transversely-perforated and longitudinally-grooved brace 30, and the adjusting latch-arm 26, pivoted upon the horizontal reel-supporting arm and adapted to engage the perforations in the brace 30.

9. In a butt-adjuster for harvesters, the shaft of the roller 48, having affixed to its lower end the pinion 55, and the disk 51, provided with the radially-projecting lip 53, and secured to the lower side member, c', of the frame 47, in combination with the supporting-bracket 46, having the opening 52 and notch 54, through which the pinion 55 and lip 53 may pass, and within which the disk 51 has its seat, whereby the adjuster-frame may be removed from or replaced in its supporting-bracket, as and for the purpose set forth.

10. In a butt-adjuster for harvesters, the shaft of the roller 48, having secured to its lower end a pinion, 55, and the disk 51, the frame 47, to which the disk 51 is fastened, and the supporting-bracket 46, provided with the opening 52, through which the pinion 55 may pass and within which the disk 51 has its seat.

11. In a self-binding harvester, a binder-standard having at its upper end a seat for the binder-supporting pipe 62, and at its lower end a lip, 59, in combination with a part of the main frame provided with a hole, 60, having a groove, 61, as shown, to admit the lip 59, whereby, when the standard is inserted in its seat in the hole 60 and turned to its proper position to receive the supporting-pipe 62, it will be firmly held in place, as described.

12. In a raising and lowering device for harvesters, the windlass 65, having the bearing 64 in the main frame, and extending thence grainward in a direction substantially at a right angle to the plane of inclination of the elevator-frame, whereon the upper end of the windlass-shaft has its bearing, and the operating-lever 67, mounted on the upper end of the said windlass-shaft, whereby the plane of movement of the operating-lever is substantially parallel with the plane of inclination of the elevator.

13. In a grain-harvester, the shoe 46, having a rearward extension provided with the lip 70, and the rear sill, 69, in combination with the plank 71, provided with the transverse grooves 72 and 73, adapted to fit, respectively, to the lip 70, and the sill 69, as and for the purpose described.

SAMUEL V. KENNEDY.
CHARLES A. ANDERSON.

Witnesses:
D. STRUNK,
FRANK D. MERCHANT.